US012729816B2

(12) United States Patent
Tran

(10) Patent No.: US 12,729,816 B2
(45) Date of Patent: Sep. 8, 2026

(54) METHOD AND DEVICE FOR DETERMINING THE PRESSURE PREVAILING IN A TANK

(71) Applicant: Robert Bosch GmbH, Stuttgart (DE)

(72) Inventor: Sonny Tran, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 18/684,286

(22) PCT Filed: Aug. 11, 2022

(86) PCT No.: PCT/EP2022/072569
§ 371 (c)(1),
(2) Date: Feb. 16, 2024

(87) PCT Pub. No.: WO2023/036554
PCT Pub. Date: Mar. 16, 2023

(65) Prior Publication Data

US 2026/0132892 A1 May 14, 2026

(30) Foreign Application Priority Data

Sep. 9, 2021 (DE) ..................... 10 2021 209 978.5

(51) Int. Cl.
*G01L 9/00* (2006.01)
*F17C 13/02* (2006.01)
*F17C 13/04* (2006.01)

(52) U.S. Cl.
CPC ............ *F17C 13/025* (2013.01); *F17C 13/04* (2013.01); *F17C 2205/0326* (2013.01); *F17C 2250/043* (2013.01)

(58) Field of Classification Search
None
See application file for complete search history.

(56) References Cited

U.S. PATENT DOCUMENTS

2006/0011245 A1 1/2006 Suzuki et al.
2015/0267840 A1* 9/2015 Seid ...................... F16K 37/005 73/708

(Continued)

FOREIGN PATENT DOCUMENTS

CN 101765713 A 6/2010
DE 102006027712 A1 12/2006

(Continued)

OTHER PUBLICATIONS

Translation of International Search Report for Application No. PCT/EP2022/072569 dated Nov. 21, 2022 (2 pages).

*Primary Examiner* — Alexander A Mercado
(74) *Attorney, Agent, or Firm* — Michael Best & Friedrich LLP

(57) ABSTRACT

The invention relates to a method (20) for determining a tank pressure prevailing in a tank,
characterized by the following features:
- a predefined voltage (10) is applied to a solenoid of a solenoid valve closing the tank (21),
- the current (11) flowing through the solenoid is measured (22) until a decrease (13) of the current (11), which is characteristic for an opening (12) of the solenoid valve, is registered, and
- the tank pressure is calculated based on the current (11) measured during the decrease (13) (23).

9 Claims, 2 Drawing Sheets

(56) References Cited

U.S. PATENT DOCUMENTS

| | | | | |
|---|---|---|---|---|
| 2015/0268119 | A1* | 9/2015 | Najmolhoda | F16D 48/066 73/708 |
| 2016/0102779 | A1* | 4/2016 | Lang | F02D 41/2467 123/294 |
| 2016/0245314 | A1* | 8/2016 | Najmolhoda | F16D 48/066 |
| 2016/0339887 | A1 | 11/2016 | Okano et al. | |
| 2018/0031180 | A1 | 2/2018 | Kim et al. | |

FOREIGN PATENT DOCUMENTS

| | | | |
|---|---|---|---|
| DE | 102016220259 | A1 | 4/2018 |
| WO | 2009125259 | A1 | 10/2009 |
| WO | 2012017667 | A1 | 2/2012 |
| WO | 2020070013 | A1 | 4/2020 |
| WO | 2020120072 | A1 | 6/2020 |
| WO | 2020240043 | A1 | 12/2020 |

* cited by examiner

METHOD AND DEVICE FOR DETERMINING THE PRESSURE PREVAILING IN A TANK

BACKGROUND

The present invention relates to a method for determining the pressure prevailing in a tank. The present invention further relates to a corresponding device, a corresponding computer program, and a corresponding storage medium.

For example, in hydrogen-powered vehicles according to the prior art, pressurized tanks are used in carbon fiber-reinforced plastic that can withstand tank pressures of up to 800 bar. The resulting storage density gives the generic vehicle a range of more than 500 km.

DE102006027712A1 discloses an electromagnetic shut-off valve having a particular application for opening and closing a pressurized hydrogen storage tank. In one embodiment, the valve comprises two valve sealing elements, wherein one side of a valve sealing element is on the high-pressure side of the valve and an opposite side of the other valve sealing element is on the high-pressure side of the valve. Thus, the pressure applied to the two valve sealing elements is compensated so that less force is required to open the valve against the high pressure.

Also known are so-called direct-controlled solenoid valves, the drive of which acts directly on a sealing element in the form of a needle-shaped valve piston. With the electromagnet off, a compression spring keeps the valve closed by pushing the valve piston against the valve seat. The direction of flow of the medium through the valve is set as intended, such that, when the valve is closed, the differential pressure building up between the inlet and outlet of the valve additionally pushes the valve piston against the valve seat. In order to open the valve, the piston must be lifted off the valve seat by the electromagnetic drive alone; the drive must therefore operate against the compression spring and against the differential pressure applied to the valve piston. The minimum required force of the electromagnetic drive to open such a valve depends above all on the spring force, the valve seat size, and the maximum differential pressure with the valve closed.

SUMMARY

The invention provides a method for determining the pressure prevailing in a tank, a corresponding device, a corresponding computer program, and a corresponding storage medium according to the disclosure.

The proposed method is based on the knowledge that a shut-off valve is commonly used in pressurized gas tank containers in mobile applications, e.g., in hydrogen tank systems. The valve should close when the vehicle is at a standstill and thus seal the tank container. In operation, the valve opens and thereby allows the removal of gas to supply fuel to the drive system.

For example, a shut-off valve of this type may be constructed as a solenoid-operated control valve of the design outlined above. At standstill, the valve is closed, wherein the spring presses the valve needle onto the valve seat as described, thus sealing the tank container. To open the valve in operation, an electrical voltage is applied to the solenoid. The magnetic force generated thereby overcomes the closing spring force and compressive force and thereby opens the valve.

The approach according to the invention also takes into account the need to control or monitor the condition of the tank container to measure its gas temperature and pressure. However, in conventional tank systems with multiple tank containers, not every container may be equipped with a pressure sensor. Instead, often only a single high-pressure sensor is installed in the high-pressure line that measures the pressure therein. In operation, when tank valves of all tank containers are open, the pressure in the tank containers may be calculated or at least estimated from the measured pressure in the high-pressure line. However, before the tank valves are opened, e.g., when starting the vehicle, the pressure in the tank containers is unknown without a pressure sensor. This is particularly disadvantageous if there is different pressure in the individual tank containers at startup. In such a situation, due to strong pressure differences between the tank containers and the high-pressure line, some tank valves may be delayed in opening, possibly delaying the overall start of the vehicle.

However, the procedure described below makes it possible, when starting the vehicle while the tank valves are still closed, to open their tank valves in a certain sequence, knowing the pressure in individual tank containers, and thus to put the tank system into operation smoothly.

Advantageous further developments and improvements upon the basic idea specified in the independent disclosure are made possible by the measures explained in the dependent claims. Thus, it may also be advantageous to detect the pressure in the individual tank containers without pressure sensors at startup to determine the exact level of fuel in the respective tank container.

According to another aspect, it may be provided to create a software function that determines the pressure in a tank container in which a pressure sensor is not installed before the tank valve configured as a solenoid-controlled shut-off valve is opened. This function may partially replace a pressure sensor in the tank reservoir to allow for smooth opening of the tank system as well as determination of the tank system level at startup.

BRIEF DESCRIPTION OF THE DRAWINGS

Exemplary embodiments of the invention are illustrated in the drawings and explained in greater detail in the subsequent description. The drawings show.

DETAILED DESCRIPTION

Figure 1:
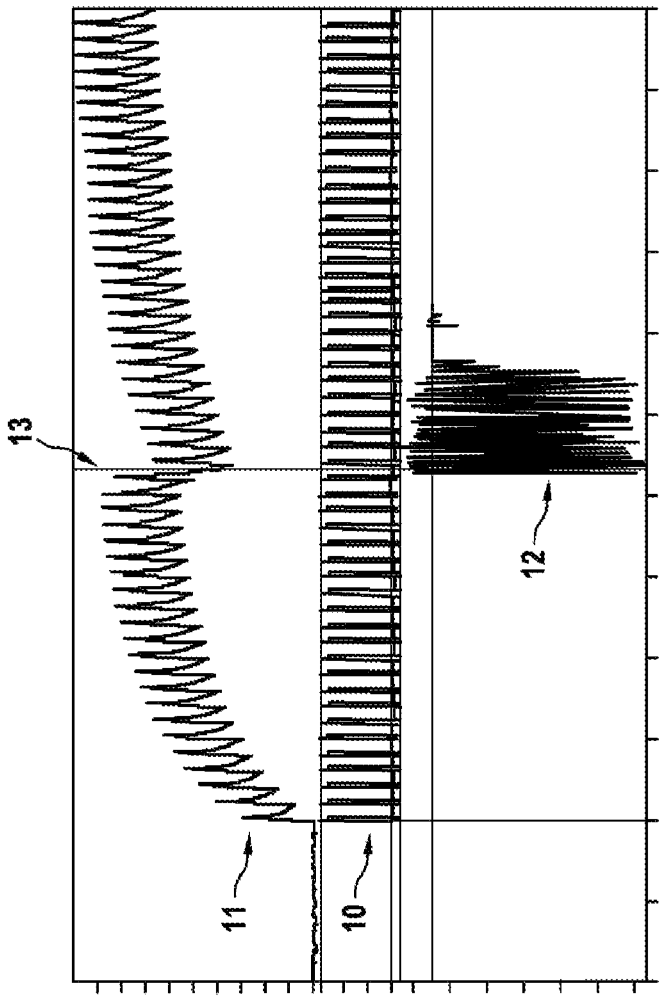
FIG. 1 a decrease of current, which is characteristic for the opening of a solenoid valve, through the solenoid.

FIG. 1 illustrates a decrease (13) of current (11), which is characteristic for the opening (12) of a shut-off solenoid valve, through the solenoid. In the closed state of the shut-off valve, the spring force pressing the valve needle onto the valve seat and the compressive force prevail. If an electric voltage (10) is applied to the solenoid, a magnetic force is built up. Once it overcomes the spring force and compressive force, the valve begins to open.

The time point of this first valve needle stroke can be seen in the chart according to FIG. 1 by a kink in the graph of the current intensity (11). At this time, the compressive force can be determined by looking at the spring force, compressive force, and magnetic force together. The spring force is generally known as the design variable; the magnetic force can be determined from the electrical current (11) and the parameters of the solenoid. The tank pressure can thus be determined from the compressive force calculated in this manner and the pressure measured in the high-pressure line.

Figure 2:
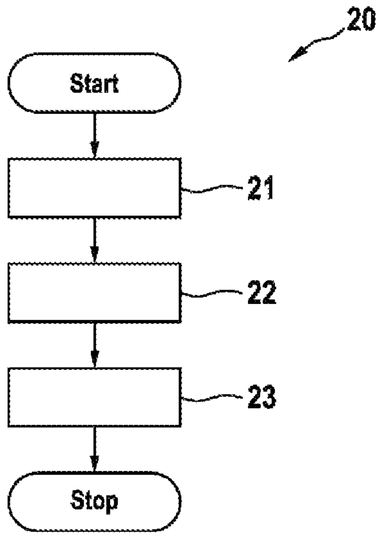
FIG. 2 the flow chart of a method according to a first embodiment.

Based on this interdependency of effects, the commissioning of a hydrogen-powered motor vehicle with several tanks connected by a common pressure line, which are filled with fuel to varying degrees and are each closed by a solenoid valve, can in particular be optimized. This application example is now explained on the basis of the flow diagram according to FIG. 2.

First, a predefined voltage (10—FIG. 1) is applied to the solenoid of each solenoid valve (process 21) and the current flowing through the solenoid (11—FIG. 1) is measured (process 22) until a decrease (13) in the current (11—FIG. 1), which is characteristic for the opening (12—FIG. 1) of the solenoid valve, is registered, which is indicative of the onset of the stroke movement of the valve needle against the spring force exerted by the valve spring. In addition, the line pressure prevailing in the common pressure line is measured once by means of the pressure sensor provided for this purpose.

Based on the current (11—FIG. 1) through the coil measured during the decrease (13—FIG. 1), on the one hand, and the structurally caused and thus substantially known force of the spring that loads the valve, on the other, the pressure difference between the respective tank and pressure line is now calculated, from which the tank pressure can be directly derived in view of the known line pressure (process 23). The tank pressure calculated in this way can in turn be used to determine the fuel level in the respective tank or the sequence in which the opening (12—FIG. 1) of the solenoid valves occurs for the purpose of supplying fuel to the fuel cell and/or engine.

Figure 3:
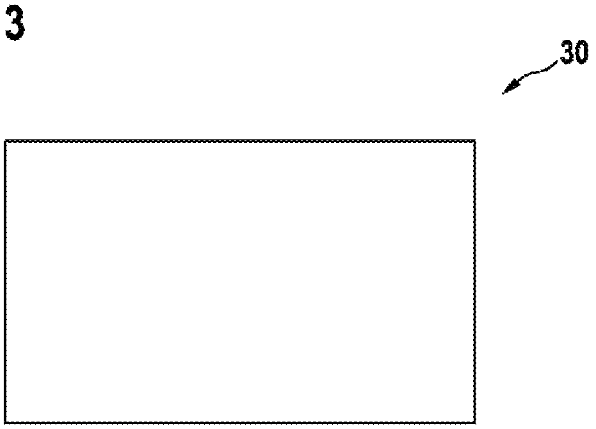
FIG. 3 schematically a control unit according to a second embodiment.

This method (20) can be implemented, for example, in software or hardware or in a mixed form of software and hardware, for example, in a control unit (30), as the schematic representation in FIG. 3 illustrates.

The invention claimed is:

1. A method (20) for determining a tank pressure prevailing in a tank, the method comprising:
- applying a predefined voltage (10) to a solenoid of a solenoid valve closing the tank (21),
- measuring (22) a current (11) flowing through the solenoid until a decrease (13) of the current (11), which is characteristic for an opening (12) of the solenoid valve, is registered, and
- determining the tank pressure based on the current (11) measured during the decrease (13) (23).

2. A method (20) according to claim 1, wherein:
- the solenoid valve is loaded by a valve spring, and
- the determination (23) is further performed based on a structurally determined spring force exerted by the valve spring.

3. The method (20) according to claim 2, wherein:
- the spring force acts on a valve needle of the solenoid valve, and
- the decrease (13) occurs upon a stroke movement of the valve needle.

4. The method (20) according to claim 1, wherein:
- the solenoid valve connects the tank to a pressure line,
- the line pressure prevailing in the pressure line is measured, and
- the determination (23) occurs by first calculating a pressure difference between the tank and the pressure line, and then from the line pressure and the pressure difference of the tank pressure.

5. The method (20) according to claim 4, wherein:
- the pressure line is connected to further tanks by further solenoid valves, and
- the method (20) is applied sequentially to each of the tanks.

6. The method (20) according to claim 5, wherein:
- the tanks are at least partially filled with a fuel, and
- from the determined tank pressure, a fill level of the fuel in the respective tank is inferred.

7. The method (20) according to claim 6, wherein:
- a motor vehicle is driven by means of the fuel, and
- the opening (12) of the solenoid valves of the tanks during startup of the motor vehicle is carried out in a sequence dependent on the tank pressure determined in each case.

8. A non-transitory, computer-readable storage medium containing instructions that when executed by a computer cause the computer to determine a tank pressure prevailing in a tank, by:
- applying a predefined voltage (10) to a solenoid of a solenoid valve closing the tank (21),
- measuring (22) a current (11) flowing through the solenoid until a decrease (13) of the current (11), which is characteristic for an opening (12) of the solenoid valve, is registered, and
- determining the tank pressure based on the current (11) measured during the decrease (13) (23).

9. A computer (30), the computer (30) configured to:
- apply a predefined voltage (10) to a solenoid of a solenoid valve closing a tank (21). measure (22) a current (11) flowing through the solenoid until a decrease (13) of the current (11), which is characteristic for an opening (12) of the solenoid valve, is registered, and determine a tank pressure based on the current (11) measured during the decrease (13) (23).

* * * * *